United States Patent Office 2,802,723
Patented Aug. 13, 1957

2,802,723

PRODUCTION OF SODIUM CARBIDE

Charles H. Lemke, Niagara Falls, N. Y., assignor to E. I. du Pont de Nemours and Company, Wilmington, Del., a corporation of Delaware No Drawing. Application October 23, 1953, Serial No. 388,072

7 Claims. (Cl. 23—208)

This invention relates to sodium carbide and has for its primary object the provision of a method for preparing this compound. A secondary object of the invention is provision of a method for preparing acetylene by way of sodium carbide as an intermediate.

Heretofore the reaction between caustic soda and carbon has been utilized for the preparation of sodium. Thus Castner, U. S. P. 342,897, claims the production of sodium by the diffusion of carbon into molten alkali fused at moderate temperatures. Various modifications of the Castner process have been developed such as, for example, that of Ylla-Conte, U. S. P. 1,837,935, in which the sodium is obtained first as a vapor and subsequently as the condensate of the vapor. The basic reaction of such art as Castner and Ylla-Conte may be represented by the equation:

(1) $6NaOH + 2C \rightarrow 2Na + 3\uparrow H_2 + 2Na_2CO_3$

It has now been discovered that fused caustic soda can be reacted with carbon under certain conditions to form a product containing sodium carbide. This product can then be reacted with water to yield the valuable commercial gas acetylene. The reaction mechanism producing the carbide is unknown. Speculation, however, suggests that elemental sodium is first evolved as shown by the prior art mentioned above and then reacts with carbon in the presence of molten caustic to produce the carbide. If the mechanism postulated is correct, it represents as far as known the first example of the production of sodium carbide by direct interaction of the elements. Previous attempts to carry out this reaction have uniformly ended in failure. Molten sodium hydroxide is thus seen in the role of an essential promoter and no reaction is possible in its absence. Regardless of the exact mechanism involved, and that mentioned is purely speculative, an overall equation may be written as follows:

(2) $6NaOH + 4C \rightarrow Na_2C_2 + 3\uparrow H_2 + 2Na_2CO_3$

Several factors are instrumental in promoting the formation of sodium carbide. In the first place molten caustic soda must be present for any reaction to occur at all. In case of depletion of the caustic, however, the reaction merely stops. The same situation does not obtain in case the carbon is depleted. In the latter instance the reaction of Equation 1 is promoted and the yield of carbide reduced or eliminated entirely. To insure production of sodium carbide in good yield it is therefore desirable that the carbon utilized be in excess of that stoichiometrically required by Equation 1. At least a 50% excess should be used if best results are to be attained. Preferably the carbon employed should approximate or slightly exceed that stoichiometrically required by Equation 2. A first prerequisite of the desired reaction is therefore seen to be the presence of both molten caustic soda and free carbon in the reaction mixture.

The preferred reaction temperature for carrying out the process of this invention lies between about 700° and about 900° C. Within this temperature range mixtures of carbon and sodium hydroxide will always produce some sodium carbide provided that the supply of free carbon in the mixture is not exhausted. Preferably the reaction temperature is kept below the boiling point of sodium, i. e. about 880° C. at standard pressure, thus insuring that product sodium is not removed by volatilization. Control of pressure during the reaction is not considered particularly important, ambient pressure being quite suitable.

The form of carbon employed is likewise not of particular importance. Coal, coke, carbon-black, charcoal or any of the other commercial forms of the element may be utilized indifferently.

To facilitate the production of the carbide, hydrogen should be removed from the reaction mixture as rapidly as it is formed. Sodium, however, should be retained in contact with the reaction mixture. In a preferred mode of operating the invention product sodium is, in fact, refluxed with the reaction mixture.

It will be readily understood that the reaction should be carried out in the substantial absence of air, water vapor or other oxidizing gas.

Conditions detrimental to the production of the carbide will also be readily recognized. Thus heating the mixture much above 900° C. or the approximate boiling point of sodium will tend to reduce contact time between the solid reactants and sodium and hence reduce the yield of carbide. The same undesirable result is achieved by preventing reflux of product sodium or by sweeping the sodium from the reactants by means of an inert gas. The formation of the carbide is, however, most easily prevented by limiting the amount of carbon used to that required by Equation 1 and carrying the reaction to completion.

The solid residue from Reaction 2 will in general contain sodium carbonate as well as sodium carbide. Separation of these materials as such presents some difficulties. It is, however, unnnecessary to separate the compounds for their effective utilization. The production of acetylene by adding water to the mixture is obvious. The carbide may thus conveniently be recovered as acetylene. The product mixture may furthermore be employed directly as a source of sodium carbide for other conventional applications of the latter material.

The invention will be understood in more detail from the several examples given below. In each run exemplified a retort, made from a two-inch nickel pipe fitted with a nickel thermo-well, was inserted into a conventional furnace and utilized as a reaction chamber. Sodium was collected in a side arm integral with the retort. Dry pelleted sodium hydroxide and powdered petroleum coke were placed in the retort and heated to the reaction temperature. Reaction began at about 700° C. with noticeable evolution of gas and was complete by the time the approximate boiling point of sodium was reached.

EXAMPLE 1

This example illustrates generally the production of sodium carbide by the reaction of sodium and carbon in the presence of molten caustic soda.

A series of runs was made charging coke and sodium hydroxide into the retort in the approximate stoichiometric quantities required by Equation 1 above. Sodium was swept out as soon as it was formed by means of hydrogen gas. Data are shown in Table I.

Table I.—Production of $Na_2C_2$, sodium removed when formed

| Run | 1 | 2 | 3 | 4 | 5 |
|---|---|---|---|---|---|
| Maximum Temp. (° C.) | 750 | 750 | 750 | 850 | 850 |
| NaOH Charged (g.) | 153 | 154.5 | 152.5 | 153 | 152 |
| Coke Charged (g.) | 15.5 | 15.5 | 15.5 | 15.5 | 15.5 |
| Na Produced (g.) | 4.5 | 12.2 | 21.3 | 17.0 | 24.1 |
| $Na_2CO_3$ Produced (g.) | 87.2 | 97.5 | 112.4 | 111.6 | 120.8 |
| Hydrogen Produced (g.) | 2.29 | 2.24 | 2.63 | 2.87 | 2.55 |
| Percent $Na_2C_2$ in Residue | 4.41 | 3.12 | 0.02 | 2.61 | 0.45 |

EXAMPLE 2

This example illustrates the effects of excess coke and of refluxing product sodium.

Two more runs were made with the reactor in a vertical position so that sodium produced would reflux with the reaction mixture. No sweeping gas was employed. In the sixth run the stoichiometric reactant weights required by Equation 1 only were employed. In the seventh run a 50% excess of coke over that required by Equation 1 was used. In each run the maximum temperature reached was 900° ± 20° C. Other data are found in Table II.

Table II.—Production of $Na_2C_2$, sodium refluxed

| Run | 6 | 7 |
|---|---|---|
| NaOH Charged (g.) | 154 | 153 |
| Coke Charged (g.) | 15.5 | 22 |
| Na Produced (g.) | 11.33 | 11 |
| $Na_2CO_3$ Produced (g.) | 109 | 127.1 |
| Hydrogen Produced (g.) | 3.41 | 2.93 |
| Percent $Na_2C_2$ in Residue | Nil | 10.3 |

Run 6 shows that no carbide is produced after the carbon is exhausted even when sodium reflux is employed. Run 7 shows that a combination of excess coke and refluxed sodium can markedly increase the carbide yields possible.

Various modifications may be made in the procedure described without departing from the spirit of the invention. The size of the coke particles charged is, for example, not particularly critical. Lumps ranging in size from ¼" in diameter to 300 mesh were successfully utilized in different runs. Unreacted coke was always found in a finely-divided condition regardless of the size of the lumps initially added.

Contact time between reactants is another feature that is not critical to the invention. Generally, the reaction will be substantially complete in 10–12 minutes if a premixed charge of coke and caustic is melted and heated up to the desired maximum temperature, i. e., 850°–900° C. If, however, coke is added to molten caustic, the reaction time may be increased, depending on the rate of addition of coke. Since the reaction is more difficult to control when powdered coke is added to molten caustic, the batch fusion of preformed mixtures is the preferred mode of carrying out the reaction.

Having now described the invention, I claim:

1. The method of forming sodium carbide which comprises reacting a mixture containing free sodium hydroxide and free carbon at a temperature of around 700°–900° C., said free carbon being in excess of the stoichiometric requirement for the formation of said carbide from said sodium hydroxide.

2. The method of claim 1 in which the reaction temperature is around 850°–900° C.

3. The method of claim 1 in which the carbon utilized is particulate.

4. The method of claim 1 in which the carbon utilized is petroleum coke.

5. The method of claim 1 in which the free sodium produced by concurrent reaction along with the sodium carbide is retained in the reaction mixture.

6. The method of claim 5 in which the free sodium is refluxed.

7. The method of claim 1 in which the hydrogen produced concurrently with the sodium carbide is removed from the reaction mixture as it is formed.

References Cited in the file of this patent

UNITED STATES PATENTS

| 1,996,185 | Wulff | Apr. 2, 1935 |
| 2,642,347 | Gilbert | June 16, 1953 |

FOREIGN PATENTS

| 714,312 | Germany | Nov. 27, 1941 |
| 300,721 | Italy | Sept. 17, 1932 |

OTHER REFERENCES

Ephraim: "Inorganic Chemistry" (1943), Nordeman Pub. Co. (New York, N. Y.), page 848.